United States Patent Office 3,733,403
Patented May 15, 1973

3,733,403
GELLED MINERAL OIL
James Ling Chen, East Brunswick, N.J., assignor to E. R. Squibb & Sons, Inc., New York, N.Y.
No Drawing. Filed Jan. 26, 1970, Ser. No. 5,931
Int. Cl. A61k 9/06; C10m 5/26, 5/10
U.S. Cl. 424—83                                            7 Claims

ABSTRACT OF THE DISCLOSURE

Mineral oil gelled with a gellant selected from polyethylene and polymethylpentene and contains 0.1–5% by weight of powdered porous magnesium silicate as an anti-syneresis agent.

BACKGROUND OF THE INVENTION

Mineral oil vehicles prepared by dissolving in the oil a modifying (gelling) agent soluble therein at elevated temperature are described in U.S. Pats. 2,627,938 and 2,628,187. The disclosures of these patents are incorporated herein by reference. A disadvantage of such vehicles is their susceptibility to syneresis or bleeding whereby mineral oil which separates from the base can cause soiling of both the carton and the label. For this reason such vehicles cannot be packaged safely in jars. Even when packaged in blind end tubes, the seepage of oil due to syneresis can occur once the tube is opened.

OBJECTS OF THE INVENTION

It is an object of the present invention to provide an improved mineral oil base vehicle for ointments, salves and the like. Another object is to provide an improved mineral oil base vehicle for medicaments. A further object is to provide a vehicle having a mineral oil base which is stabilized against syneresis or bleeding. These and other objects of the present invention will be apparent from the following description.

DETAILED DESCRIPTION

It has now been found that the susceptibility to syneresis of a gelled mineral oil base vehicle, prepared for example, according to the foregoing patents, is prevented by incorporating into the vehicle a small amount of highly porous powered magnesium silicate. The magnesium silicate has the formula $MgO \cdot 2.5SiO_2 \cdot 1.5H_2O$. The particle size of the magnesium silicate is from about 0.5 to about 35 microns. The surface area of the highly porous powdered magnesium silicate is from about 250 to about 350 $m.^2/g$. The magnesium silicate is employed in a quantity of from about 0.1% by weight to about 5% by weight depending on the ratio of mineral oil and gelling agent in the base. Preferably the amount of magnesium silicate is from about 0.2% to about 2.5% by weight, and most preferably from about 0.25% to about 1% by weight.

Suitable gelling agents are polyethylene as described in the aforementioned patents or methylpentene polymers such as TPX grade R methylpentene polymers supplied by I.C.I. (Organics) Inc.

The stabilized vehicle of the present invention may be prepared by any method which is suitable to incorporate the highly porous powdered magnesium silicate into the gelled mineral oil base vehicle whereby the magnesium silicate is incorporated into the vehicle in a substantially uniform manner. Suitable methods for carrying this out are, for example, by use of a roller mill, ball mill, mixing vessels provided with agitators, etc. A preferred method is to form a concentrate by mixing the magnesium silicate with a portion of the gelled mineral oil base, for example, about one part by weight of magnesium silicate to about ten parts by weight of gelled mineral oil base, and then to add the balance of the gelled mineral oil base. Alternatively, it is possible to incorporate the magnesium silicate into the mineral oil base before adding the gelling agent, or to add the magnesium silicate and gelling agent simultaneously to the mineral oil. In these latter methods, the magnesium silicate will be present in the oil before or during the gelling process.

The following examples illustrate the present invention without, however, limiting the same thereto.

EXAMPLES 1–5

A hydrocarbon gel is prepared according to Example II of U.S. Pat. No. 2,627,938. Magnesium silicate is incorporated into the gel in three stages. A concentrate is first formed by mixing one part of magnesium silicate with ten parts of hydrocarbon gel in a Hobart type mixer and then passed through a roller mill. When a uniform mixture is obtained, the balance of the hydrocarbon gel is added and mixed in a Hobart mixer until homogeneous.

Five formulations are prepared in the foregoing manner having the following composition:

| Jar | Hydrocarbon gel (g.) | Magnesium silicate | |
|---|---|---|---|
| | | g. | Percent |
| 1 | 40 | 0.1 | 0.25 |
| 2 | 40 | 0.2 | 0.5 |
| 3 | 40 | 0.4 | 1.0 |
| 4 | 40 | 0.6 | 1.5 |
| 5 | 40 | 0.8 | 2.0 |

Each formulation is placed in a 2 oz. jar and a 45° cone-shaped indentation made in the top of each jar to a depth of about one inch. After being stored overnight at 50° C., the jars are inspected. No oil accumulation is found in any of the indentations.

EXAMPLES 6–10

The procedure of Examples 1–5 is repeated with formulations having the following composition:

| Jar | Hydrocarbon gel (g.) | Magnesium silicate | |
|---|---|---|---|
| | | g. | Percent |
| 6 | 100 | 0.1 | 0.1 |
| 7 | 200 | 0.1 | 0.05 |
| 8 | 400 | 0.1 | 0.025 |
| 9 | 50 | 0.1 | 0.2 |
| 10 | 50 | 0 | 0 |

After placing in jars, indenting and storing as in Examples 1–5, an oil accumulation of 0.5 ml. is found in control jar 10, and lesser accumulations are found in comparative jars 7 and 8. Jars 6 and 9 show no oil accumulation.

What is claimed is:
1. A vehicle consisting essentially of a major amount of mineral oil gelled with a gellant selected from the group consisting of polyethylene and polymethylpentene and containing an anti-syneresis agent comprising from about 0.1% to about 5% by weight of highly porous powdered magnesium silicate.
2. A vehicle according to claim 1 wherein the magnesium silicate has a surface area of from about 250 to about 350 $m.^2/g$.
3. A vehicle according to claim 1 wherein the magnesium silicate has a particle size of from about 0.5 to about 35 microns.
4. A vehicle according to claim 1 wherein the magnesium silicate is present in an amount from about 0.2% to about 2.5% by weight.
5. A vehicle according to claim 1 wherein the magnesium silicate is present in an amount from about 0.25% to 1% by weight.
6. A vehicle according to claim 1 wherein the gelling agent is polyethylene.

7. A vehicle according to claim 1 wherein the gelling agent is polymethylpentene.

References Cited

UNITED STATES PATENTS

| 2,626,899 | 1/1953 | Abrams et al. | 252—22 |
| 2,573,650 | 10/1951 | Peterson | 252—22 |
| 2,627,938 | 2/1953 | Frohmader et al. | 252—59 |
| 3,076,764 | 2/1963 | Hansen et al. | 252—59 |
| 3,083,160 | 3/1963 | Agius et al. | 252—59 |
| 3,350,307 | 10/1967 | Brown et al. | 252—28 |

PATRICK P. GARVIN, Primary Examiner

I. VAUGHN, Assistant Examiner

U.S. Cl. X.R.

252—28, 59; 424—357